United States Patent
Emmanuel

(10) Patent No.: US 7,436,307 B2
(45) Date of Patent: Oct. 14, 2008

(54) METHOD AND SYSTEM FOR SETTING PARAMETERS OF A FIELD STATION IN A COMMUNICATIONS NETWORK

(75) Inventor: Michel Emmanuel, Chazelles (FR)

(73) Assignee: Schneider Electric Industries SAS, Rueil-Malmaison (FR)

(*) Notice: Subject to any disclaimer, the term of this patent is extended or adjusted under 35 U.S.C. 154(b) by 126 days.

(21) Appl. No.: 11/383,302

(22) Filed: May 15, 2006

(65) Prior Publication Data
US 2006/0273906 A1 Dec. 7, 2006

(30) Foreign Application Priority Data
Jun. 1, 2005 (FR) .................................. 05 51462

(51) Int. Cl.
*G08B 13/14* (2006.01)
(52) U.S. Cl. .................................. 340/572.4; 340/572.1
(58) Field of Classification Search ............... 340/572.1, 340/572.4, 572.7, 572.8, 568.1, 686.6, 539.11, 340/539.13, 539.15, 539.21, 10.1, 10.2, 10.5, 340/825.49
See application file for complete search history.

(56) References Cited

U.S. PATENT DOCUMENTS 4,839,631 A * 6/1989 Tsuji .......................... 340/541
7,023,342 B2 * 4/2006 Corbett et al. ............ 340/572.1
2006/0109135 A1 * 5/2006 Donat et al. ............. 340/686.6

FOREIGN PATENT DOCUMENTS

| DE | 196 01 511 C1 | 8/1997 |
| DE | 198 42 351 C1 | 7/2000 |
| EP | 1 136 934 A1 | 9/2001 |
| EP | 1 324 494 A1 | 7/2003 |

* cited by examiner

*Primary Examiner*—Van T. Trieu
(74) *Attorney, Agent, or Firm*—Oblon, Spivak, McClelland, Maier & Neustadt, P.C.

(57) ABSTRACT

A method is presented for setting parameters of a field station equipped with an antenna for exchanging data in a contactless manner through RFID technology with electronic tags, the field station equipped with a signalling unit and equipped with electronic circuits including a memory containing at least one parameter. The invention consists in particular of updating a field station parameter as a function of the duration for which an electronic setting tag remains within the range of the field station antenna and of transmitting a signal using a signalling unit when the parameter of the field station is being updated.

15 Claims, 1 Drawing Sheet

123# METHOD AND SYSTEM FOR SETTING PARAMETERS OF A FIELD STATION IN A COMMUNICATIONS NETWORK

BACKGROUND OF THE INVENTION

1. Field of the Invention

The subject of the present invention is a method for setting parameters of a field station equipped with an antenna for exchanging data in a contactless manner through inductive RFID technology with electronic tags, equipped with a signalling unit and equipped with electronic circuits including a memory containing a parameter such as for example a network address. The invention also concerns a system for setting parameters of the field station.

In certain production or handling processes, it is sought to identify the products or moving objects with a view to tracking the management of information related to the said products or moving objects. One known method consists in assigning data to each product or moving object using an electronic tag and in exchanging this information with distributed field stations.

An RFID (Radio Frequency Identification) system is commonly used to identify, via a field station, objects each carrying an electronic identification tag. Within the range of the reader/writer station, the electronic tag exchanges a variety of information with the station, such as for example identification information or information related to the production process taking place.

The field stations communicate with automation equipment (data server on the network) generally in a fieldbus such as MODBUS, FIPIO, etc. In an RFID type identification system, each station has an antenna generating a magnetic field for powering each electronic tag passing within its range and for communicating with the latter according to a predefined communication protocol. The tag is powered by the "carrier" transmitted from the station's antenna. The energy received by the tag's antenna is converted to electrical energy and powers the internal circuits (memory, control circuit, etc.) of said tag in order that the tag executes the programs for which it is designed. This electronic tag stores data, executes commands from the station and transmits requested data to the station. The exchange procedure involves several phases, in particular: transmission of energy as soon as the tag arrives within the range of the field station, the sending of an identification command by the field station, sending a read/write command, writing data or reading data.

Contactless data exchange is achieved through an inductive technology which is based on the use of a medium-frequency electromagnetic signal (carrier) for the contactless transmission of information between stations and electronic tags.

2. Description of the Prior Art

The different field stations are identified in an automation network by distinct addresses. Presently, the addresses of each field station are set via a button or a coding wheel implemented in each station (document EP1324494) or using a terminal that the operator connects to each of the stations in the network.

Document DE 196 01 511 C1 discloses a method for setting parameters of a reader station. This method is executed in a contactless manner between the reader station and a card connected to a personal computer via a serial link. When the card is close to the station, the magnetic field from the station powers the circuits of the card which can send parameter-setting data retrieved on the personal computer to the station. In this method, the parameter-setting operation requires heavy and expensive infrastructure.

SUMMARY OF THE INVENTION

The invention aims to provide a simple solution to set parameters of field stations, in the context of small applications. It can be used to set for example the network address of field stations without having to use an adjustment component (button or coding wheel) in the stations or without having to connect a terminal to the station or to an external card.

This aim is achieved by a method for setting parameters of a field station equipped with an antenna for exchanging data in a contactless manner through inductive technology with electronic tags, and equipped with electronic circuits including a memory containing at least one parameter, the said method being characterized in that the field station implements steps for:

recognizing an electronic setting tag when the said electronic setting tag passes within the range of the antenna, initializing the parameter of the station at the moment when the field station recognizes the electronic setting tag, determining the parameter of the field station as a function of the time in which the electronic setting tag remains within the range of the antenna, and transmitting a signal using a signalling unit when the parameter of the field station is being modified.

According to the invention, the determination of the parameter consists in incrementing the parameter at a predefined frequency while the electronic setting tag remains within the range of the antenna. For this purpose, the signalling unit includes a light-emitting diode emitting a flash of light each time the parameter increments.

According to the invention, the method also consists in transmitting, using the signalling unit, a number of signals corresponding to the parameter of the field station stored in the memory, when the electronic setting tag is no longer within the range of the antenna of the field station. The signalling unit includes for example a light-emitting diode emitting at regular intervals flashes of light, the number of such flashes being equal to the parameter of the field station stored in the memory.

According to the invention, the step for recognizing the electronic setting tag is carried out after the field station is powered up, by presenting an electronic setting tag within the range of its antenna.

The aim is also achieved by a system for setting parameters of a field station equipped with an antenna and with electronic circuits including a memory intended to contain at least one parameter and able to exchange data in a contactless manner through inductive technology with electronic tags. The system is characterized in that it includes an electronic setting tag and in that the field station includes means for recognizing the electronic setting tag, means for determining the parameter as a function of the time in which the electronic setting tag remains within the range of the antenna and a signalling unit capable of transmitting a signal when the parameter of the field station is being modified.

According to the invention, the determination means initialize the parameter of the field station when the electronic setting tag arrives within the range of the antenna.

According to the invention, after initialization, the determination means increment the parameter of the field station at a predefined frequency while the electronic setting tag remains within the range of the antenna. The signalling unit therefore includes a light-emitting diode emitting a flash of light each time the parameter of the field station increments.

According to the invention, the signalling unit is capable of transmitting a number of signals corresponding to the parameter of the field station stored in the memory, when the electronic setting tag is no longer within the range of the antenna.

The signalling unit includes a light-emitting diode emitting at regular intervals flashes of light, the number of such flashes being equal to the stored parameter of the field station.

According to the invention, the recognition means are executed each time the field station is powered up.

According to the invention, the parameter to be updated is for example an address identifying the field station in a communications network, such as for example an automation network.

BRIEF DESCRIPTION OF THE DRAWINGS

Other features and advantages will become apparent in the following detailed description referring to an embodiment given by way of example and represented by the accompanying drawings in which.

DESCRIPTION OF THE PREFERRED EMBODIMENTS

Figure 1:
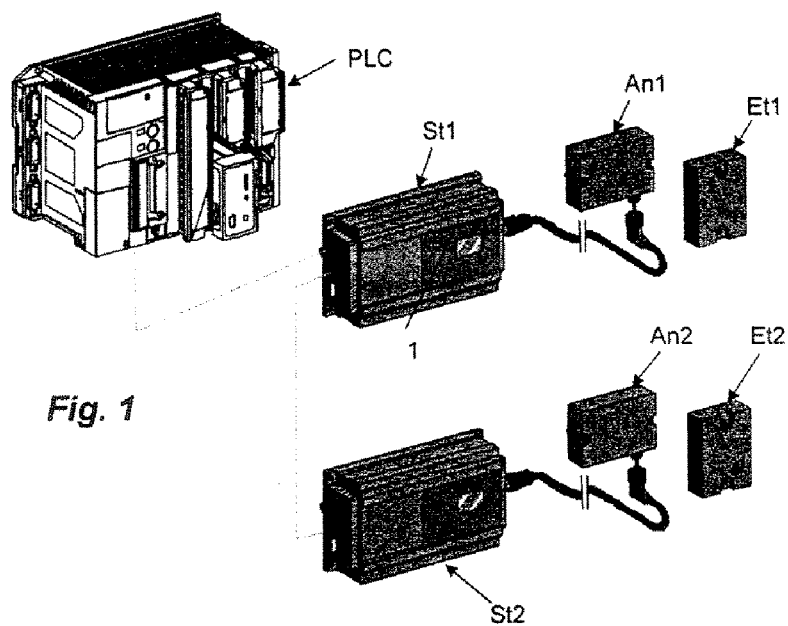
FIG. 1 shows a view in perspective of a tag identification system connected to automation equipment.

The system illustrated in FIG. 1 includes field stations St1, St2 each equipped with an external antenna An1, An2 and capable of exchanging, in a contactless manner through inductive RFID type technology, data with electronic tags Et1, Et2 equipped with memories storing data.

The electronic tags Et1, Et2 are of the RFID type and are fixed to products or moving objects of the process to be managed or monitored, and, over time, move past within the range of field stations such as St1, St2. Each field station St communicates with the automation equipment PLC (data server on the network) generally in a fieldbus such as MODBUS, FIPIO, etc.

The antenna An1, An2 of the station St1, St2 generates a magnetic field for powering each electronic tag Et1, Et2 passing within its range and enables the station St1, St2 to communicate with it. Each field station St1, St2 has connectors 2, 3, 4 (FIG. 2) for the power supply connection, connection to the network and connection to a control console or to a workstation such as a PC. Another connector is for connecting the antenna An1, An2 which may be separate from the station, as in the drawings, or integrated with the station. The station St1, St2 contains a memory M (FIG. 2) and electronic interface circuits for interfacing with input/output connectors 2, 3, 4 and with the antenna.

The contactless data exchange is achieved through an inductive technology which is based on the use of a medium-frequency electromagnetic signal (carrier) for the contactless transmission of information between the stations and the electronic tags.

The different field stations St1, St2 are identified by parameters and in particular for example by distinct addresses in the fieldbus.

Figure 2:
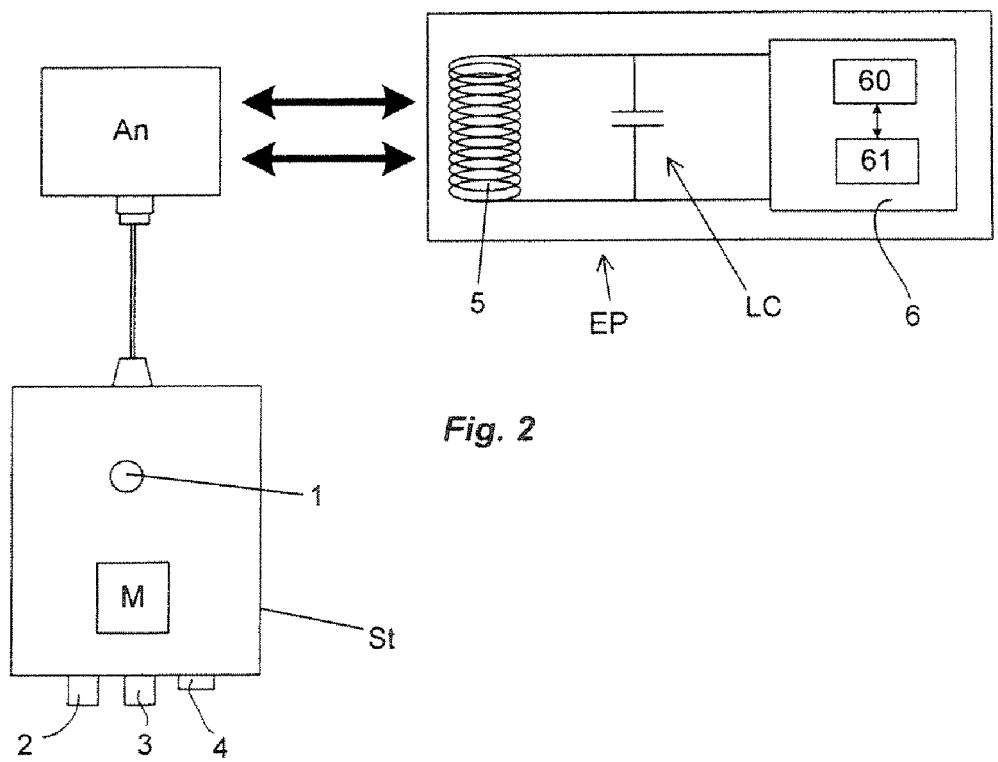
FIG. 2 is a functional diagram of a system for setting parameters of a field station of the identification system of FIG. 1.

With reference to FIG. 2, the address of a field station St in the network can be set using a special tag consisting of an electronic setting tag EP (hereafter referred to as a setting tag) which is similar in constitution to a conventional electronic identification tag Et1, Et2. If the field station St is to be addressed in the network, a setting tag EP is the first tag presented to the field station St after it is powered up.

As with an electronic identification tag, the exchange of data between the field station St and the setting tag EP is executed in a contactless manner through an inductive technology based on the use of a medium-frequency electromagnetic signal (carrier). This type of technology is known in the prior art and does not form the subject of the present invention.

The setting tag EP has an antenna 5 including an oscillating circuit LC and an electronic circuit 6 including in particular a memory 60 and data processing means 61 to interpret the requests sent by the field station St and to send requested information. The setting tag EP is powered by the "carrier" transmitted from the antenna An of a field station St as soon as it arrives within the range limits of the said field station St. The energy received by the antenna 5 of the setting tag EP is converted to electrical energy and powers the internal electronic circuits 6 of the setting tag EP. The setting tag EP stores data, executes commands from the field station St and transmits requested data to the field station St.

The memory 60 contained in the setting tag EP is by way of indication a RAM, EEPROM or FeRAM technology memory and stores, for example in encrypted form, a unique identifier, communication parameters, a code identifying it as a setting tag EP and possibly usage parameters or service instructions of the field station St.

The procedure of exchange between the field station St and the setting tag EP involves several phases, in particular:
transmission of energy as soon as a setting tag arrives within the range of a field station St,
the sending by the field station St of an identification command and the response of the setting tag EP with the sending of a unique identifier,
request from the field station St to retrieve the communication parameters to be set up between the field station St and the setting tag EP.

Furthermore, to set the network address of a field station St, the setting tag EP must be the first tag presented within the range of the antenna An of the field station St after it is powered up. Therefore each time it is powered up, the field station St checks whether the first tag presented to it is a conventional electronic tag Et1, Et2 or an address setting tag EP. The field station St sends a request to retrieve the identification code of the tag presented and uses recognition means to identify this tag.

When powering up, if a field station St identifies the first tag as an address setting tag EP, it initializes its address to 0 and loads a program for setting its network address.

According to this parameter-setting program, the field station St determines the address using a counter and a clock. The field station St thus increments the counter as a function of the time in which the setting tag EP is held within the range of its antenna An. The counter is for example incremented by 1 after each second spent by the setting tag EP within the range of the antenna An. At each increment, the field station St transmits a signal from a signalling unit. The signalling unit has for example a light-emitting diode (or "LED") 1 which lights up at each increment, or an audible indicator beeping at each increment, or for example an LCD type display. The address set in the field station St therefore corresponds for example to the final number of flashes emitted by the LED 1 while the setting tag EP remained held in front of the antenna An of the station St.

By withdrawing the setting tag EP from the range of the antenna An of the field station St, the user stops the address from incrementing. The last value registered by the counter is then stored in its memory M and forms the network address set for the field station St.

The operator can check the address set via the echoing, on the light-emitting diode 1 or on another indicator, of a number of rapid flashes equal to this stored address. These echo-flashes are for example of a different colour from those emitted during the incrementing phase.

According to the invention, various parameters can be updated in the field station St using several different setting tags EP, each tag being assigned for updating a specific parameter of the field station St. In that case, each setting tag EP has a distinct identification code recognized by the field station St which, depending on this code, loads a specific parameter-setting program. The various parameter-setting programs operate as a function of the time in which the setting tag EP is held within the range of the antenna An of the station St.

According to the invention, these various setting tags for updating various parameters of the station St can also be physically combined in the same setting tag. This setting tag then has several areas, each area being assigned for updating a parameter in the station St. The presentation of an area of the setting tag within the range of the antenna An of the field station St results in the corresponding update program being loaded in the station. Each area is for example equipped with an oscillating circuit LC and an associated electronic circuit 6 or, in one variant, the setting tag can have a common oscillating circuit and a common electronic circuit. In that case, the setting tag then has means enabling the user to choose the parameter to update in the field station St, in order to send to the field station St the identification code for the parameter-setting program to be loaded.

The invention therefore forms a simple, rapid and practical means, at a reduced cost, for setting parameters of a field station St in an automation network.

The parameter-setting system according to the invention may be used to configure parameters other than the network address of a field station St, in particular the type of network protocol to be used or operating codes.

Clearly it is possible, without departing from the context of the invention, to imagine other variants and minor improvements and likewise envisage the use of equivalent means.

The invention claimed is:

1. Method for setting a value of a parameter of a field station equipped with an antenna for exchanging data in a contactless manner through inductive RFID technology with electronic tags, the field station equipped with electronic circuits including a memory containing at least one parameter, wherein in said method, the field station implements steps of:
   recognizing an electronic setting tag when the electronic setting tag passes within range of the antenna,
   initializing the value of the parameter of the field station at the moment when the field station recognizes the electronic setting tag,
   updating the value of the parameter of the field station as a function of the duration for which the electronic setting tag remains within the range of the antenna, and
   transmitting a signal using a signalling unit when the parameter of the field station is being updated.

2. The method according to claim 1, wherein the updating the value for the parameter includes incrementing the parameter at a predefined frequency for the duration for which the electronic setting tag remains within the range of the antenna.

3. The method according to claim 2, wherein the signalling unit includes a light-emitting diode emitting a flash of light each time the value of the parameter increments.

4. The method according to claim 1 or 2, wherein the method further comprises:
   transmitting, using the signalling unit, a number of signals corresponding to the value of the parameter of the field station stored in the memory when the electronic setting tag is no longer within the range of the antenna of the field station.

5. The method according to claim 4, wherein the signalling unit includes a light-emitting diode emitting flashes of light at regular intervals, the number of such flashes being equal to the value of the parameter of the field station stored in the memory.

6. The method according to claim 1, wherein the step of recognizing the electronic setting tag is carried out after the field station is powered up when an electronic setting tag comes within the range of the antenna.

7. The method according to claim 1, wherein the parameter to be updated is an address identifying the field station in a communication network.

8. System for setting a value of a parameter of a field station equipped with an antenna and with electronic circuits including a memory containing at least one parameter, the field station able to exchange data in a contactless manner through inductive technology with electronic tags, the system comprising:
   an electronic setting tag and
   the field station including a recognition means for recognizing the electronic setting tag, updating means for updating the value of the parameter as a function of a duration for which the electronic setting tag remains within range of the antenna and a signalling means for transmitting a signal when the value of the parameter of the field station is being updated.

9. The system according to claim 8, wherein the updating means initializes the value of the parameter of the field station when the electronic setting tag arrives within the range of the antenna.

10. The system according to claim 9, wherein the updating means increments the value of the parameter of the field station at a predefined frequency while the electronic setting tag remains within the range of the antenna.

11. The system according to claim 10, wherein the signalling means includes a light-emitting diode emitting a flash of light each time the value of the parameter of the field station is incremented.

12. The system according to one of claims 8 to 10, wherein the signalling means transmits a number of signals corresponding to the value of the parameter of the field station stored in the memory when the electronic setting tag is no longer within the range of the antenna.

13. The system according to claim 12, wherein the signalling means includes a light-emitting diode emitting flashes of light at regular intervals, the number of such flashes being equal to the stored value of the parameter of the field station.

14. The system according to claim 8, wherein the recognition means is executed each time the field station is powered up.

15. The system according to claim 8, wherein the parameter to be updated is an address identifying the field station in a communications network.

* * * * *